United States Patent [19]

Haraguchi et al.

[11] Patent Number: 5,631,939
[45] Date of Patent: May 20, 1997

[54] INITIAL CORE OF NUCLEAR POWER PLANT

[75] Inventors: Hiroko Haraguchi; Yoshihiri Iwashita; Toshiro Yoshioka; Junichi Koyama; Akihiro Yamanaka; Mitsunari Nakamura, all of Hitachi; Katsumasa Haikawa, Jyuou-machi, all of Japan

[73] Assignee: Hitachi, Ltd., Tokyo, Japan

[21] Appl. No.: 521,372

[22] Filed: Aug. 31, 1995

[30] Foreign Application Priority Data

Sep. 9, 1994 [JP] Japan .................... 6-215563

[51] Int. Cl.$^6$ .................................. G21C 5/00
[52] U.S. Cl. ........................... 376/349; 376/267
[58] Field of Search ........................... 376/214, 267, 376/349, 444

[56] References Cited

U.S. PATENT DOCUMENTS 4,894,200  1/1990  Yamashita ................ 376/349
4,926,450  5/1990  Masuhara et al. ........ 376/444
5,349,619  9/1994  Mochida et al. ......... 376/444

FOREIGN PATENT DOCUMENTS 57-8486  1/1982  Japan .

*Primary Examiner*—Daniel D. Wasil
*Attorney, Agent, or Firm*—Antonelli, Terry, Stout & Kraus, LLP

[57] ABSTRACT

In an initial core constituted by various kinds of fuel assemblies having a different average enrichment of uranium 235 four fuel assemblies having the lowest average enrichment constitute a square shaped cell. Three fuel assemblies having the highest average enrichment constitute an L-shaped cell, and the L-shaped cell is arranged at corners of the square shaped cells, whereby each assembly of the L-shaped cell adjoins a square shaped cell. The ratio of the number of assemblies of the L-shaped cell to the total number of fuel assemblies in the core is 10% or more.

12 Claims, 7 Drawing Sheets

| 1 | LOW ENRICHMENT ASSEMBLY | 244 |
| 2 | MIDDLE ENRICHMENT ASSEMBLY | 176 |
| 3 | HIGH ENRICHMENT ASSEMBLY | 344 |

L-SHAPED CELL CONSTITUTED BY THREE HIGH ENRICHMENT ASSEMBLIES

FIG. 1
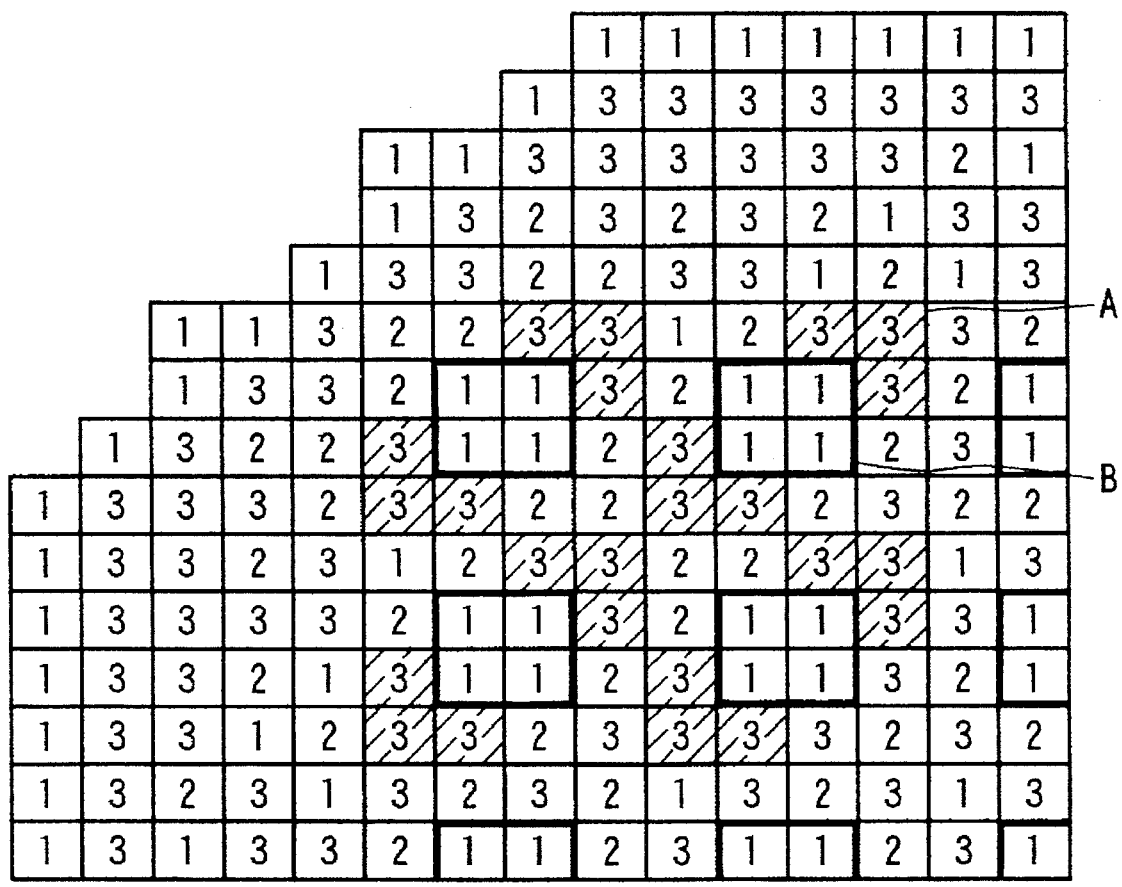
| | LOW ENRICHMENT ASSEMBLY | 244 |
| :---: | :--- | :--- |
| 2 | MIDDLE ENRICHMENT ASSEMBLY | 176 |
| 3 | HIGH ENRICHMENT ASSEMBLY | 344 |
 L-SHAPED CELL CONSTITUTED BY THREE HIGH ENRICHMENT ASSEMBLIES

FIG. 2

LOADING PATTERN
OF ASSEMBLIES

| 1 | 1 | 2 | 3 | 1 | 1 | 2 |
|---|---|---|---|---|---|---|
| 1 | 1 | 3 | 2 | 1 | 1 | 3 |
| 2 | 3 | 3 | 2 | 2 | 3 | 3 |
| 3 | 2 | 2 | 3 | 3 | 2 | 2 |
| 1 | 1 | 2 | 3 | 1 | 1 | 2 |
| 1 | 1 | 3 | 2 | 1 | 1 | 3 |
| 2 | 3 | 3 | 2 | 2 | 3 | 3 |

MARKS INDICATING
LOADING POSITION
OF ASSEMBLIES

|   |   |   |   |   |   |   |
|---|---|---|---|---|---|---|
|   |   |   |   |   |   |   |
|   | C | D | E | F |   |   |
|   | G | H | I | J |   |   |
|   |   |   | K | L |   |   |
|   |   |   | M | N |   |   |
|   |   |   |   |   |   |   |

[1] LOW ENRICHMENT ASSEMBLY

[2] MIDDLE ENRICHMENT ASSEMBLY

[3] HIGH ENRICHMENT ASSEMBLY

FIG. 3
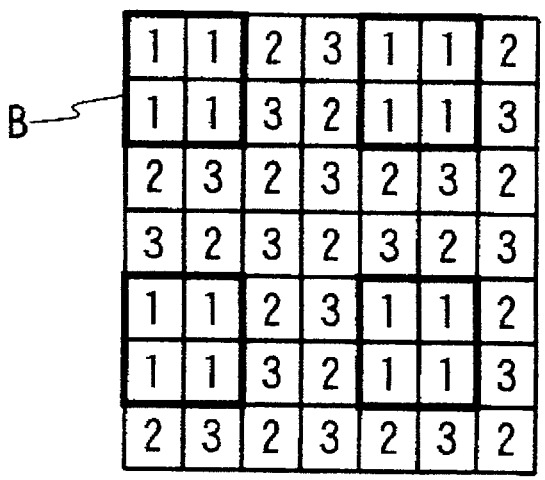
LOADING PATTERN OF ASSEMBLIES
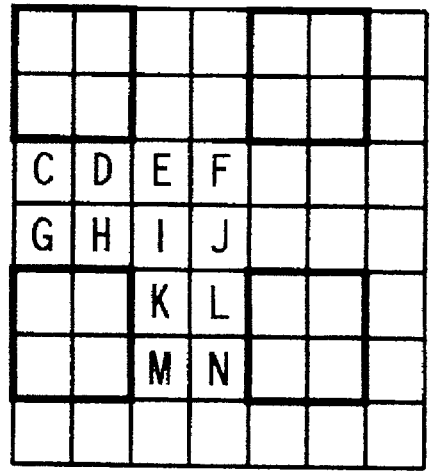
MARKS INDICATING LOADING POSITION OF ASSEMBLIES
[1]  LOW ENRICHMENT ASSEMBLY
[2]  MIDDLE ENRICHMENT ASSEMBLY
[3]  HIGH ENRICHMENT ASSEMBLY

| 1 | LOW ENRICHMENT ASSEMBLY | 272 |
| 2 | MIDDLE ENRICHMENT ASSEMBLY | 204 |
| 3 | HIGH ENRICHMENT ASSEMBLY | 396 |

| 1 | LOW ENRICHMENT ASSEMBLY | 216 |
| 2 | MIDDLE ENRICHMENT ASSEMBLY | 176 |
| 3 | HIGH ENRICHMENT ASSEMBLY | 372 |

| 1 | LOW ENRICHMENT ASSEMBLY | 240 |
| 2 | MIDDLE ENRICHMENT ASSEMBLY | 184 |
| 3 | HIGH ENRICHMENT ASSEMBLY (LOW Gd ASSEMBLY) | 236 |
| 4 | HIGH ENRICHMENT ASEEMBLY (HIGH Gd ASSEMBLY) | 104 |

INITIAL CORE OF NUCLEAR POWER PLANT

BACKGROUND OF THE INVENTION

This invention is related to an initial core of a Boiling Water Reactor (BWR) disposed in a nuclear power plant.

Generally speaking, in a conventional BWR, the average enrichment of fuel assemblies in an initial core is the same for all fuel assemblies. In a nuclear reactor, ⅓–¼ of all fuel assemblies of are taken out at every operation cycle and they are replaced by new fuel assemblies. But, the average enrichment of fuel assemblies for the initial core is set to such a value that the burning of the fuel assemblies is possible for a period of 2–3 cycles (in the following, this is referred to as "the first cycle"). At the end of the first cycle, it is uneconomical, in the exchange of the fuel assemblies, for the fuel assemblies which are not burned enough and which contain a large amount of uranium 235 to be taken out of the core.

Thus, after the first cycle, fuel assemblies are changed partially and the operations are continued. These operation cycles are referred to as "the second cycle", "the third cycle", etc. New fuel assemblies which are loaded at the beginning at second cycle or of the later cycles are called reload fuel assemblies.

The core in which reload fuel assemblies are loaded consecutively over several operation cycles after the first cycle eventually reaches a stable core state. That is to say, the thermal characteristics of both the previous cycle and the next cycle are almost the same and the operation cycle becomes stable with respect to the thermal characteristics. This operation cycle is called an equilibrium cycle. The core which has reached an equilibrium cycle is called an equilibrium core.

In such a nuclear reactor, it is preferable for the thermal characteristics and cycle exposure in intermediate cycles (in the following, referred to as a "transition cycle") between the first cycle and the equilibrium cycle to be substantially the same as those of the equilibrium cycle, or for the transition cycle to reach the characteristics and exposure of the equilibrium cycle as soon as possible. However, like the conventional initial core, in the case where the average enrichment of fuel assemblies is one and the same level, a long time is necessary for changing from the transition cycle to the equilibrium cycle and a change of all the number of reload fuel assemblies in the transition cycle is large.

For this reason, in a BWR, it has been suggested to combine various kinds of fuel assemblies having a different average enrichment to constitute an initial core. Fuel assemblies of lower average enrichment are taken out in such an arrangement after one operation cycle and are replaced with new fuel assemblies so that the average discharge exposure of the fuel assemblies loaded in the initial core is increased and a quick transition to the next cycle is carried out. This technology is described in Japanese patent laid-open No. 57-8486, for example.

On the other hand, for extension of an operation cycle and for high exposure, it is necessary to increase the average enrichment in the initial core. As mentioned above, when various kinds of fuel assemblies having a different average enrichment are combined into the initial core, the difference of enrichment among the fuel assemblies becomes large, and the difference in nuclear properties between high enrichment assemblies and low enrichment assemblies becomes large.

When the fuel assemblies having largely different nuclear properties adjoin each other, each fuel assembly radiates neutrons to adjacent fuel assemblies because of the different neutron spectrum of the respective fuel assemblies. As a result, in the early stage of burning, the Maximum Linear Power Heart Generation Ratio (MLHGR) becomes large and the thermal margin of the nuclear reactor core becomes small. Thus, a technical problem which arises with this core is to improve the thermal margin.

When the average enrichment of the core is increased, there is a tendency for excess reactivity in the core to become larger. Therefore, it is necessary to increase the number of control rods in the core during operation. In this case, when fuel assemblies of control cells, into which control rods are to be inserted, are burnt as a result of control rods being inserted into the control rods for a long period of time, the fuel assemblies have a smaller power at the inserting side of the control rods, but a larger power at the opposite side. Because burning of fuel rods at the inserting side is slow, there is a phenomenon that a power of the fuel rods at the inserting side becomes large when the control rods are pulled out. Therefore, fuel assemblies surrounding the control rods inserted during the operation for a long period of time are fuel assemblies having the lowest enrichment (low enrichment assemblies). In this way, in the initial core which has the objective of high exposure, it is necessary to arrange a lot of control cells, each having a control rod surrounded by four low enrichment assemblies.

Therefore, there is a tendency for the number of high enrichment assemblies to become high in fuel assemblies loaded in cells other than the control cells, and hence it is necessary to provide as many high enrichment assemblies as possible. But, since the enrichment of the high enrichment assemblies is high, when high enrichment assemblies are arranged adjacent to one another, the power of these fuel assemblies becomes higher and there is a tendency for the thermal margin of the nuclear reactor core to become severe.

SUMMARY OF THE INVENTION

In the initial core which aims at high exposure, a large number of control cells are needed because the average enrichment of the core is high. And low enrichment assemblies are necessary for the control cells because excess reactivity becomes high. Therefore, it was necessary to increase the average enrichment of the core and to load many high enrichment assemblies in cells other than control cells. However, when many high enrichment assemblies are arranged in close proximity, fuel assemblies of high reactivity are arranged closely adjacent to one another, and hence there is a problem that the thermal margin became severe.

An object of the present invention is to provide an initial core for high exposure, which is capable of increasing the thermal margin on the condition that high enrichment assemblies adjoin one another.

In order to achieve the above mentioned object, this invention adopts the following structure. In an initial core in which various kinds of fuel assemblies having different levels enrichment of uranium 235 are combined, four fuel assemblies having the lowest average enrichment (low enrichment assemblies) constitute a square shaped cell, three fuel assemblies having the highest average enrichment (high enrichment assemblies) constitute an L-shaped cell, and an L-shaped cell is arranged at the corner of a square shaped cell, whereby each assembly of the L-shaped cell adjoins a square shaped cell. Further, the ratio of the number of assemblies of the L-shaped cells to the total number of fuel assemblies in the core is 10% or more.

As to the thermal limit for fuel assemblies, there are the MLHGR and Minimum Critical Power Ratio (MCPR). Among these, the MLHGR is characterized by three peaking factors.

The first peaking factor is a local peaking factor for representing a ratio of a power of a fuel rod, in a cross section vertical to the axial direction of one fuel assembly, to an average power of all fuel rods of the one fuel assembly in the cross section.

The second peaking factor is an axial peaking factor for representing the ratio of a maximum power of one fuel assembly, in a cross section vertical to the axial direction of the one fuel assembly, to an average power of the one fuel assembly in the whole cross section.

The third peaking factor is a channel peaking factor for representing a ratio of a power of a fuel assembly to an average power of all of the fuel assemblies in a core.

This invention makes the channel peaking factor of high enrichment assemblies small.

FIG. 2 shows a loading pattern of assemblies wherein three high enrichment assemblies constitute an L-shaped cell. In FIG. 2, A indicates the L-shaped cell (represented by oblique lines) and B indicates a square shaped cell (represented by thick lines) constituted by four low enrichment assemblies. The channel peaking factor of fuel assemblies is influenced by various factors. Because the channel peaking factor represents the power of the fuel assembly, the larger the reactivity of the fuel assembly is, the higher will be the power of the fuel assembly. When the power of adjacent fuel assemblies is high, the channel peaking factor becomes higher by mutual influence. When control rods are inserted in adjacent control cells, the channel peaking factor becomes smaller because the power of the fuel assemblies of the control cells becomes low.

In the initial core, the MLHGR of the whole core can be made small by decreasing the channel peaking factor of high enrichment assemblies because the MLHGR of the high enrichment assemblies becomes higher.

In the initial core for high exposure, when there are three kinds of fuel assemblies from the point of view of enrichment, the reactivity of the middle enrichment assemblies becomes highest among the three kinds of fuel assemblies in the early stage of the first cycle. Therefore, it is easy for the MLHGR to become high when the middle enrichment assemblies are adjoined to high enrichment assemblies in the four directions of front and rear and right and left.

FIG. 3 shows this example. The feature of this loading pattern is arranging high enrichment assemblies and middle enrichment assemblies in the form of a checkerboard. In this arrangement, the channel peaking factor becomes small because fuel assemblies of high reactivity and fuel assemblies of low reactivity are arranged in turn. However, the local peaking factor at the position I is high because high enrichment assemblies are arranged at the position I. Therefore, the MLHGR occurs at the position I.

On the other hand, the channel peaking factor of the high enrichment assemblies of FIG. 2 is smaller than that of position I of FIG. 3 because the middle enrichment assemblies having a high reactivity are loaded only in two directions among adjacent positions of front and rear and right and left of the high enrichment assemblies, as shown in FIG. 2. The channel peaking factor of the middle enrichment assemblies at positions I and F of FIG. 2 is higher than that of the middle enrichment assemblies at E and J of FIG. 3. However, the local peaking factor of the middle enrichment assemblies is not so high as that of the high enrichment assemblies. Thus, even if the channel peaking factor becomes higher as in FIG. 2, the MLHGR of the whole core is not influenced.

Because fuel assemblies at positions D and L of FIG. 2 are adjacent to the control cell B into which control rods are inserted during operation, they are influenced by the control cell. That is, because the power of the fuel assemblies in control cell B becomes low, the channel peaking factor of the high enrichment assemblies becomes small.

From the above description, the MLHGR of the high enrichment assemblies can be suppressed so as to be low by arranging the high enrichment assemblies at the corner of the control cell in an L-shape, as shown in FIG. 2.

FIG. 4 shows the relationship between the MLHGR and the assembly ratio of the high enrichment assemblies of the L-shaped cell to all fuel assemblies of the core. From FIG. 4, it can be seen that the MLHGR can be made smaller than a limit value for operation by setting the assembly ratio to 10% or more. In this way, the MLHGR becomes small by arranging the high enrichment assemblies in an L-shape, as shown in FIG. 2. But, because there are a lot of high enrichment assemblies in the core, the assemblies of the L-shaped cell of FIG. 2 need to be arranged at a position where the channel peaking factor is high and the MLHGR is easy to produce in high enrichment assemblies. On this account, it is effective for decreasing the MLHGR to provide the L-shaped cells at more than a certain ratio in the core.

As described above, an initial core according to this invention can provide a small MLHGR and a high exposure effectively by making the assembly ratio more than 10%.

BRIEF DESCRIPTION OF THE DRAWINGS

FIG. 1 is a diagram which shows the first embodiment of the initial core according to this invention.

FIG. 2 is a diagram which shows a loading pattern of fuel assemblies in the core according to this invention.

FIG. 3 is a diagram which shows a loading pattern of fuel assemblies in the core of a comparative example.

DETAILED DESCRIPTION OF THE PREFERRED EMBODIMENTS

In the following, embodiments of the present invention will be described in detail.

Embodiment 1

The first embodiment according to the loading pattern of fuel assemblies in the initial core of this invention is shown in FIG. 1. In this loading pattern, the total number of fuel assemblies of the core is 764. Among them, the number of low enrichment assemblies 1 is 244, the number of middle enrichment assemblies 2 is 176, and the number of high enrichment assemblies 3 is 344.

A control cell B (represented by thick lines) into which control rods are inserted during the operation comprises four low enrichment assemblies 1, and there are 25 control cells in the core. But, this does not mean that all control cells are used during the operation. Other low enrichment assemblies 1 are arranged mainly in the outermost layer of the core. The remaining low enrichment assemblies 1 are admixed with the high enrichment assemblies 3 and the middle enrichment assemblies 2 in another region.

High enrichment assemblies 3 are mainly loaded in two regions. The first region is the second layer and the third layer from the outermost layer where the channel peaking factor is small due to the leakage of neutrons. The second region is a region other than the peripheral region of the core. In the second region, most high enrichment assemblies 3 constitute L-shaped cells A (represented by oblique lines), and the L-shaped cells A are arranged at the corner of the control cells B. The number of the L-shaped cells is 32, and the number of assemblies in all of the L-shaped cells is 96, which is equivalent to 12.6% of the total number of fuel assemblies in the core.

In this embodiment, the channel peaking factor of the high enrichment assemblies of the L-shaped cells becomes small because the power of the fuel assemblies in the control cell is low. Therefore, the MLHGR of the high enrichment assemblies can be suppressed so as to be low and the thermal margin of the core can be increased.

Embodiment 2

Figure 4:
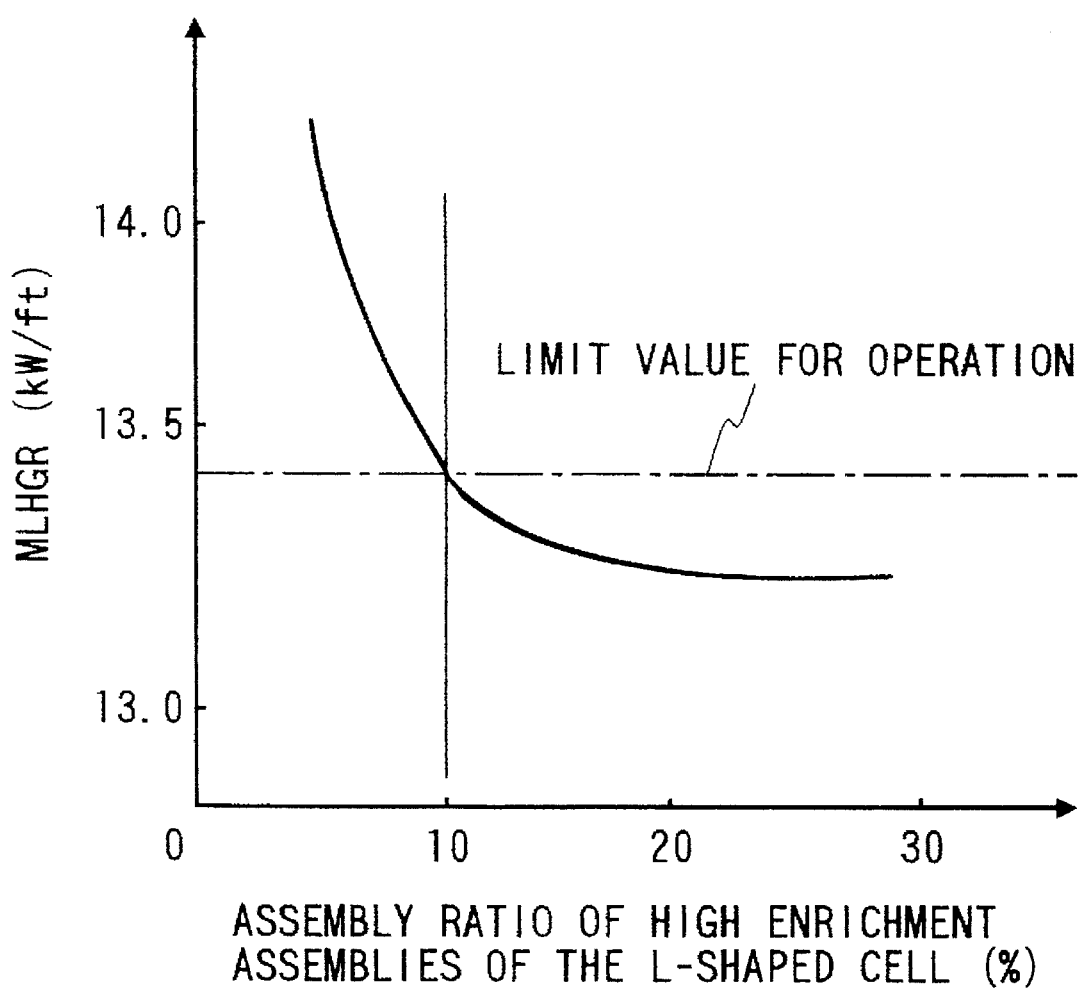
FIG. 4 is a diagram which shows the relationship between the MLHGR and the assembly ratio of high enrichment assemblies of the L-shaped cell.
Figure 5:
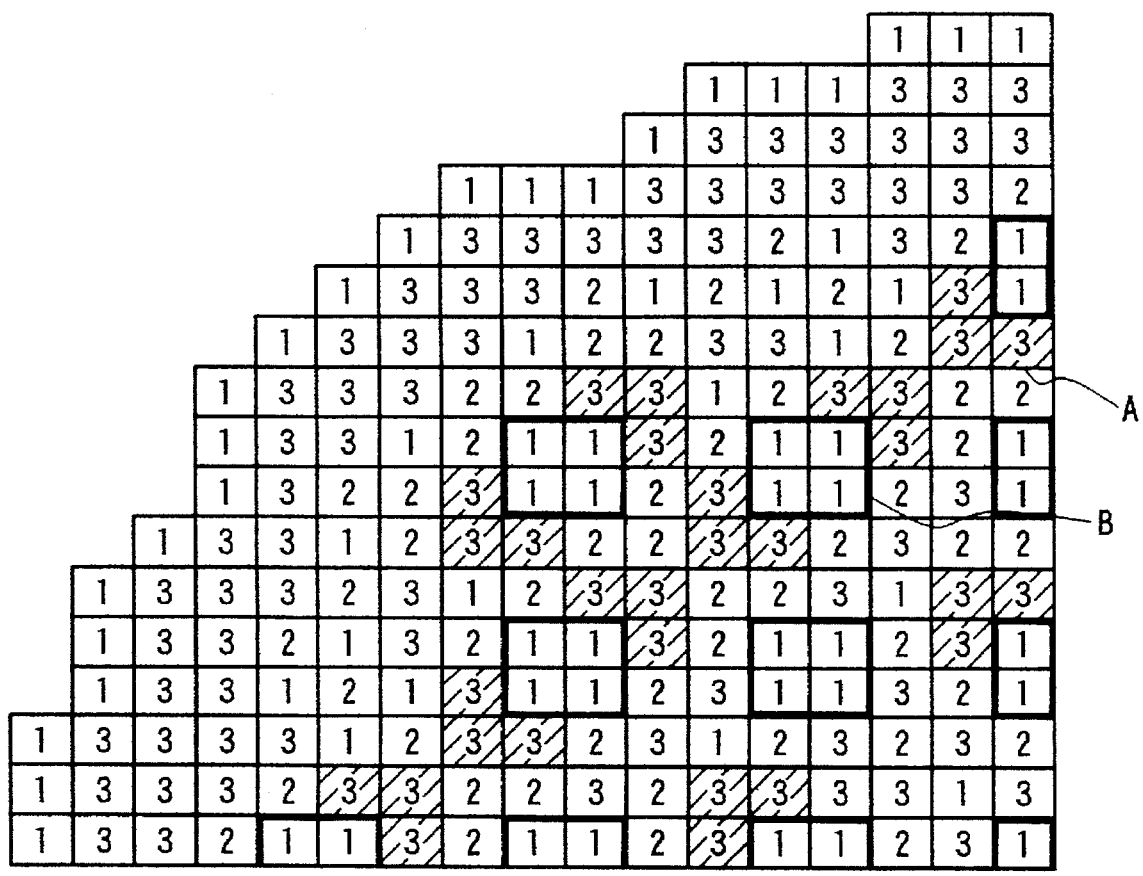
FIG. 5 is a diagram which shows a second embodiment of the initial core according to this invention.

FIG. 5 shows a second embodiment of the loading pattern of fuel assemblies in the initial core according to this invention. In this loading pattern, the total number of fuel assemblies of the core is 872. Among them, the number of low enrichment assemblies 1 is 272, the number of middle enrichment assemblies 2 is 204, and the number of high enrichment assemblies 3 is 396.

A control cell B (represented by thick lines) into which control rods are inserted during the operation comprises four low enrichment assemblies 1, and there are 29 control cells in the core. But, this does not mean that all control cells are used during the operation. Other low enrichment assemblies 1 are arranged mainly in the outermost layer of the core. The remaining low enrichment assemblies 1 are admixed with the high enrichment assemblies 3 and the middle enrichment assemblies 2 in another region.

Most high enrichment assemblies 3 constitute L-shaped cells A (represented by oblique lines), and the L-shaped cells A are arranged at the corner of the control cells B. The number of the L-shaped cells is 40, and the number of assemblies in all of the L-shaped cells is 120, which is equivalent to 13.8% of the total number of fuel assemblies in the core.

In this embodiment, the same effect can be achieved as the first embodiment. Furthermore, in this embodiment, the distribution of the power of the fuel assemblies in the core becomes flatter than in the first embodiment, because the number of the L-shaped cells is larger than that of the first embodiment. Therefore, this embodiment can achieve a flatter distribution of the channel peaking factor in the core than the first embodiment. Besides, the bigger size of the core in this embodiment as compared to the first embodiment contributes to the flatter distribution of the channel peaking factor in the core.

Embodiment 3

Figure 6:
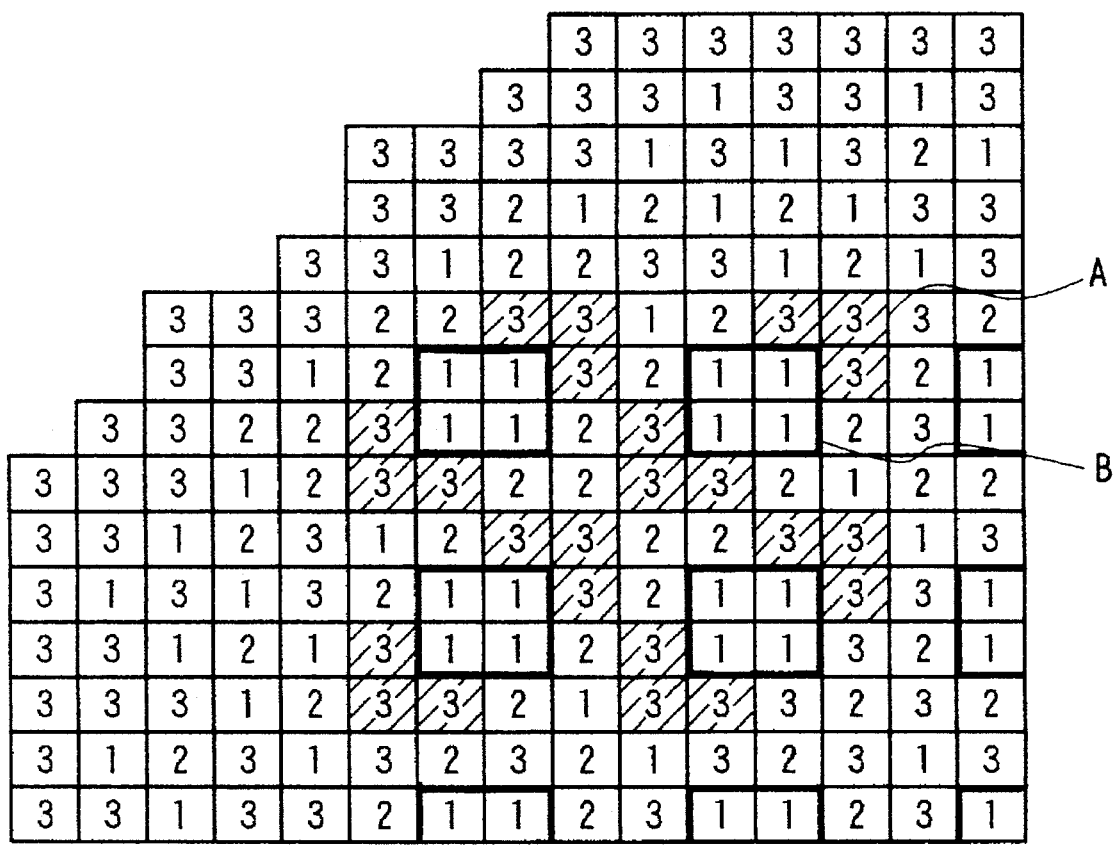
FIG. 6 is a diagram which shows a third embodiment of the initial core according to this invention.

A third embodiment of the loading pattern of fuel assemblies in the initial core according to this invention is shown in FIG. 6. In this loading pattern, the total number of fuel assemblies of the core is 764. Among them, the number of low enrichment assemblies 1 is 216, the number of middle enrichment assemblies 2 is 176, and the number of high enrichment assemblies 3 is 372.

A control cell B (represented by thick lines) into which control rods are inserted during the operation comprises four low enrichment assemblies 1, and there are 25 control cells in the core. But, this does not mean that all control cells are used during the operation. Other low enrichment assemblies 1 are admixed with the high enrichment assemblies 3 and the middle enrichment assemblies 2.

In the outermost layer of the core, high enrichment assemblies 3 are loaded. In other than the outermost layer, most high enrichment assemblies 3 constitute L-shaped cells A (represented by oblique lines), and the L-shaped cells A are arranged at corners of the control cells B. The number of the L-shaped cells is 32, and the number of assemblies in all L-shaped cells is 96, which is equivalent to 12.6% of the total number of fuel assemblies in the core.

In this embodiment, the same effect can be achieved as the first embodiment. Furthermore, in this embodiment, the power of fuel assemblies arranged in the outer region of the core can be increased because high enrichment assemblies are arranged in the outermost layer of the core. Therefore, this embodiment can achieve a flatter distribution of the channel peaking factor in the core than the first embodiment.

Embodiment 4

Figure 7:
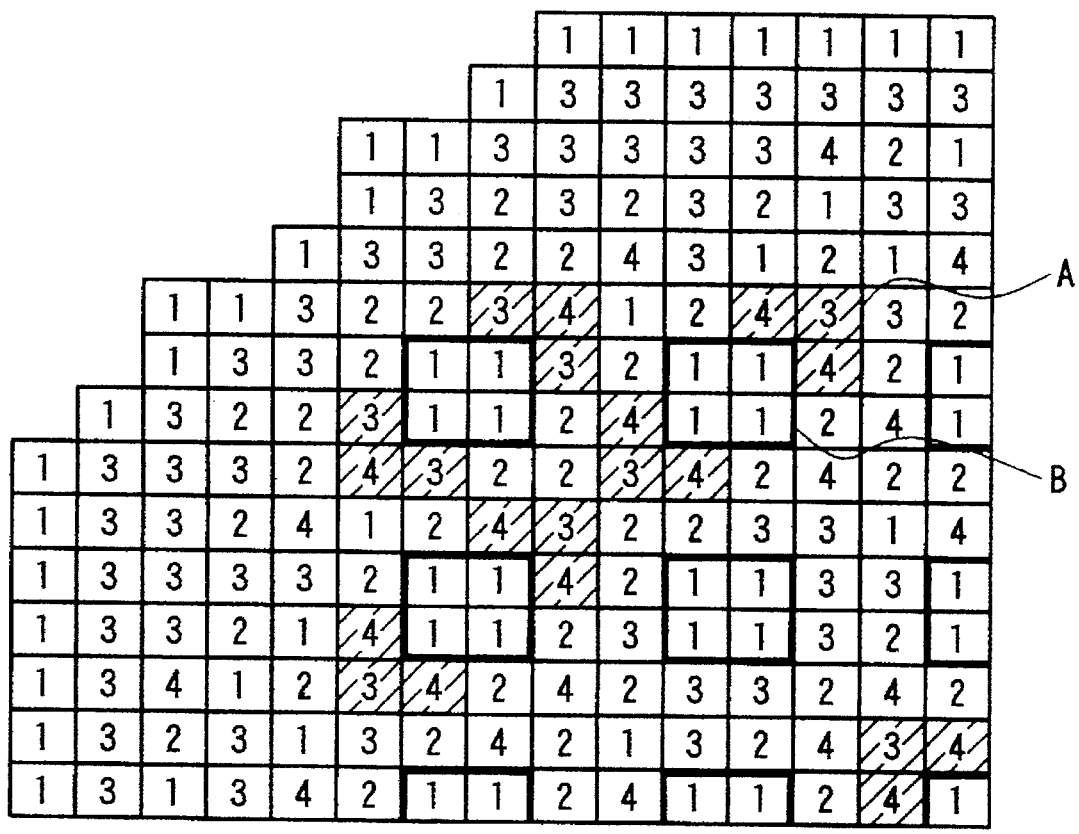
FIG. 7 is a diagram which shows a fourth embodiment of the initial core according to this invention.

A fourth embodiment of the loading pattern of fuel assemblies in the initial core according to this invention is shown in FIG. 7. In this loading pattern, the total number of fuel assemblies of the core is 764. Among them, the number of low enrichment assemblies 1 is 240, the number of middle enrichment assemblies 2 is 184, and the number of high enrichment assemblies is 340.

There are two kinds of high enrichment assemblies, the difference being the number of fuel rods containing gadolinium oxide pellets (Gd rods). In this embodiment, the number of high enrichment assemblies having a small number of Gd rods (low Gd assemblies) is 236, and the number of high enrichment assemblies having a large number of Gd rods (high Gd assemblies) is 104. The channel peaking factor can be decreased by using the two kinds of high enrichment assemblies.

A control cell B (represented by thick lines) into which control rods are inserted during the operation comprises four low enrichment assemblies 1, and there are 25 control cells in the core. But, this does not mean that all control cells are used during the operation. Other low enrichment assemblies 1 are mainly arranged in the outermost layer of the core. The remaining low enrichment assemblies 1 are admixed with the high enrichment assemblies 3 and 4 and the middle enrichment assemblies 2 in another region.

A part of the high enrichment assemblies constitute L-shaped cells A (represented by oblique lines), and the L-shaped cells A are arranged at corners of the control cells B. The L-shaped cell is composed of the two kinds of high enrichment assemblies 3 and 4. In this case, the number of the L-shaped cells is 28, and the number of assemblies in all L-shaped cells is 84, which is equivalent to 11.0% of the total number of fuel assemblies in the core. It is possible to compose the L-shaped cell of only high Gd assemblies or only low Gd assemblies.

In this embodiment, the same effect can be achieved as the first embodiment. Furthermore, it is possible to control the distribution of the power of the fuel assemblies in the core by stages by combining the high Gd assemblies with the low Gd assemblies, each of the assemblies having a different capacity for suppressing the power. Therefore, this embodiment can achieve a flatter distribution of the channel peaking factor in the core than the first embodiment. Because of this effect, this embodiment can achieve the same effect as the first embodiment on the condition that the number of L-shaped cells is smaller than the first embodiment.

What is claimed is:

1. An initial core for a nuclear reactor constituted by various kinds of fuel assemblies having different average enrichments of uranium 235, including at least lowest average enrichment fuel assemblies, and highest average enrichment fuel assemblies and middle enrichment fuel assemblies, and which comprises:

a plurality of square shaped cells each constituted by four lowest average enrichment fuel assemblies; and a plurality of L-shaped cells each constituted by three highest average enrichment fuel assemblies, each L-shaped cell being arranged at the corner of a square shaped cell so that each fuel assembly of an L-shaped cell adjoins a square shaped cell, the ratio of the number of the assemblies constituting the L-shaped cell to the total number of the fuel assemblies in the initial core being 10% or more.

2. An initial core according to claim 1, wherein the fuel assemblies of a square shaped cell adjoin control rods for controlling power of the core.

3. An initial core according to claim 1, wherein the lowest average enrichment fuel assemblies are free from burning poison.

4. An initial core according to claim 1, wherein said square shaped cells are spaced from each other by two fuel assemblies.

5. An initial core according to claim 1, wherein each square shaped cell has L-shaped cells disposed at only two diametrically opposite corners thereof.

6. An initial core for a nuclear reactor constituted by a plurality of fuel assemblies having different average enrichments including first fuel assemblies having a lowest average enrichment, second fuel assemblies having a highest average enrichment and third fuel assemblies having an average enrichment higher than the first fuel assemblies and lower than the second fuel assemblies, and which comprises:

a plurality of square shaped cells each constituted by four first fuel assemblies;

a plurality of L-shaped cells each constituted by three second fuel assemblies, at least one L-shaped cell being arranged at a corner of at least one square shaped cell so that the at least one L-shaped cell adjoins the at least one square shaped cell, a ratio of the number of fuel assemblies constituting the L-shaped cell to the total number of the fuel assemblies in the initial core being at least 10%; and the third fuel assemblies being arranged at adjacent positions with respect to at least selected ones of the second fuel assemblies.

7. An initial core according to claim 6, wherein the third fuel assemblies are arranged in at most two directions among adjacent positions of front and rear positions and right and left positions of the selected ones of the second fuel assemblies.

8. An initial core according to claim 7, wherein the selected ones of the second fuel assemblies include most of the second fuel assemblies.

9. An initial core according to claim 8, wherein the first fuel assemblies constituting the square shaped cell adjoin control rods for controlling power of the core.

10. An initial core according to claim 8, wherein the first fuel assemblies are free from burning poison.

11. An initial core according to claim 8, wherein the square shaped cells are spaced from each other by two fuel assemblies.

12. An initial core according to claim 8, wherein each square shaped cell has L-shaped cells disposed at only two diametrically opposite corners thereof.

* * * * *